United States Patent
Serpente et al.

(10) Patent No.: US 6,250,089 B1
(45) Date of Patent: Jun. 26, 2001

(54) HOT WATER CONDENSER FOR MULTI-STAGE ABSORPTION SYSTEM

(75) Inventors: Christopher P. Serpente, Liverpool; Robert C. Reimann, Lafayette, both of NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/528,082

(22) Filed: Mar. 17, 2000

(51) Int. Cl.[7] ...................................................... F25B 15/00
(52) U.S. Cl. .............................. 62/101; 62/476; 62/141; 62/238.3
(58) Field of Search .................................. 62/238.3, 101, 62/148, 141, 331, 476

(56) References Cited

U.S. PATENT DOCUMENTS

| | | | |
|---|---|---|---|
| 5,636,526 | * | 6/1997 | Plzak et al. .......................... 62/476 X |
| 5,727,397 | * | 3/1998 | He .......................................... 62/476 |
| 5,931,007 | | 8/1999 | Sgamboti et al. . |
| 5,941,094 | * | 8/1999 | Tang et al. .............................. 62/497 |

FOREIGN PATENT DOCUMENTS

352009149 * 1/1977 (JP) .

* cited by examiner

Primary Examiner—Michael Powell Buiz
Assistant Examiner—Chen-Wen Jiang
(74) Attorney, Agent, or Firm—Wall Marjama & Bilinski

(57) ABSTRACT

A multi-stage absorption refrigeration system having an upper stage that includes a generator and condenser that operate at above atmospheric pressure and a lower stage that includes a generator and a condenser that operates at or near atmospheric pressure. The upper stage condenser is placed in heat transfer relation with the lower stage generator to produce refrigerant vapor from solution contained in the lower stage generator. A water condenser is connected to the lower stage generator so that vapor produced in the lower stage generator can be used to heat hot water or other fluid. When the system is placed in a water heating mode, the flow of solution is terminated to the upper stage generator and condensate leaving the upper stage condenser is circulated back through the upper stage generator. At the same time, the loss of solution from the lower stage generator and the loss of condensate form the lower stage condenser is prevented by suitable valves and the vapor from the lower stage generator is circulated through the water condenser to heat water or other fluids.

15 Claims, 1 Drawing Sheet

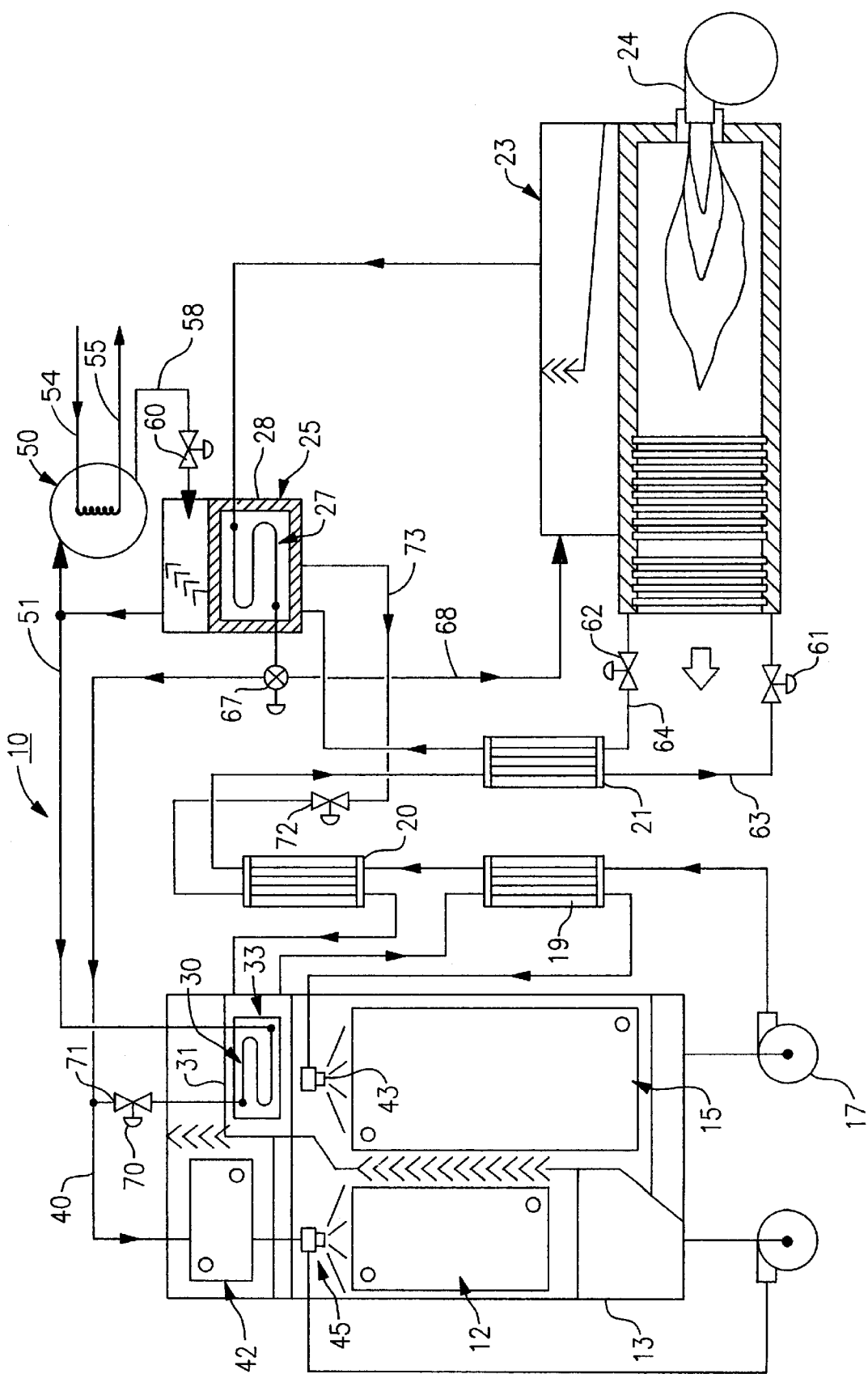

HOT WATER CONDENSER FOR MULTI-STAGE ABSORPTION SYSTEM

BACKGROUND OF THE INVENTION

This invention relates to a multiple stage absorption refrigeration system and, in particular, to a multiple stage absorption system having the capability of heating water for domestic and other uses.

In many absorption chillers, the heat transfer surfaces are encased in relatively large vessels or shells. Where the absorption system operates near or below atmospheric pressure, the shells are not required to meet safety codes. Multiple stage chillers, however, are now operating at high temperatures and pressures in the upper stages and, as a consequence, the high pressure vessels must meet the safety code requirements, thus increasing the cost of the system.

One option offered to the purchaser of a direct fired absorption system is a domestic hot water condenser wherein hot water is produced using high temperature refrigerant that is generated in the high stage boiler. Because of the pressures involved, the hot water condenser and its associated valves and piping must also meet the ASME code. This, in turn, further raises the cost of the system and, under certain conditions may adversely effect the solution concentration within the system.

SUMMARY OF THE INVENTION

It is a primary object of the present invention to improve absorption refrigeration system having the capability to heat water for domestic and other uses.

A further object of the present invention is to eliminate the need of meeting safety code requirements for a hot water condenser that is installed in a multi-stage absorption system wherein one or more upper stages operate at a relatively high pressure.

Yet another object of the present invention is to place a hot water heating condenser in direct contact with a low stage generator of a multiple stage absorption system which contains an upper stage that operates well at above atmospheric pressure and is required to meet the safety code standards.

Still another object of the present invention is to provide a hot water heating capability in an absorption cooling system without considerably raising the cost of the system.

These and other objects of the invention are attained in a multiple stage absorption refrigeration system wherein the upper stage or stages of the system operate at above atmospheric pressures. A hot water heating condenser is coupled to a lower stage generator that operates at or near atmospheric pressure so that the heat of vaporization produced in the generator is used to heat domestic hot water. Control valves are provided in the lines connecting the stages so refrigerant vapor formed in a higher pressure stage can be used to produce the heat required in the lower stage condenser. The condensate is returned to the upper stage generator. The flow of solution through the upper stage generator is also terminated at this time and the loss of solution and condensate from the lower stage generator and condenser to the rest of the system is prevented by valves positioned in the appropriate solution and condensate return lines. Refrigerant vapor formed in the lower stage generator is circulated through the hot water condenser when it is employed to heat domestic water to a desired level and the condensate from this process is returned to the lower stage generator.

BRIEF DESCRIPTION OF THE DRAWING

For a better understanding of these and other objects of the present invention, reference will be made to the following detailed description of a the invention, which is to be read in connection with the accompanying drawing which is a schematic representation of a triple effect absorption refrigeration system containing a hot water condenser embodying the teachings of the present invention.

DETAILED DESCRIPTION OF THE INVENTION

Turning now to the drawing, there is illustrated a three stage absorption machine, generally referenced 10. The absorption system includes an evaporator 12 that is contained within a single shell 13 along with an absorber 15. The evaporator is connected to the absorber in a well known manner so that refrigerant that is vaporized in the evaporator is delivered into the absorber where it is combined with an absorbent to create a weak solution that is used in the refrigerator cycle. The term weak solution is herein used to define a solution that is rich in refrigerant and weak in absorbent. A strong solution, on the other hand, refers to a solution that is weak in refrigerant and rich in absorbent. The refrigerant, for example, may be water and the absorbent may be lithium bromide which has a high affinity for water.

The weak solution is drawn from the absorber by an absorption pump 17 and passed in series through three heat exchangers 19, 20 and 21 into a generator 23 in the upper or high temperature and pressure stage of the absorption system. The upper stage generator is heated by means of a burner 24 which raises the temperature of the solution contained therein causing the refrigerant to be taken out of solution in the form of a high temperature vapor.

In this upper stage of the machine, the operating pressure within the generator and associated condenser is typically higher than 1 to 2 atmospheres. Accordingly, the generator and condenser must meet safety code requirements which considerably raises the cost of the unit and valves. In many prior art absorption machines having three or more stages, hot water for domestic purposes and other uses is heated by energy generated in the upper stage of the system. The high pressures involved in these upper stages requires that the separate hot water condenser unit must also meet the safety codes further increasing the cost of the system. As will be explained in greater detail below, the present invention is designed to generate hot water within a multiple effect absorption system having three or more stages using a hot water condenser that does not have to meet safety code standards. As a result, the costs of a multiple stage machine having a domestic hot water capability is considerably reduced.

The solution leaving the upper stage generator is passed through the upper stage heat exchanger 21 where energy is exchanged between the weak and strong solutions moving through the system. The solution from the upper stage generator is delivered from the high temperature heat exchanger into the mid stage generator 25.

Refrigerant vapor from the upper stage generators is condensed within the upper stage condenser 27 that is housed within the common shell 28 with mid-stage generator. The tubes of the condenser are in heat transfer relation with the solution contained in the mid stage generator and provides sufficient energy to vaporize refrigerant from the solution. The operating pressure in the mid stage generator is typically about 1 atmosphere and the vessel, therefore, does not have to meet safety code requirements. Strong solution from the mid stage generator 25 is passed through the mid temperature heat exchanger 20 and then passed on to lower stage generator. Here again, energy is exchanged between the weak and strong solution moving through the system.

Vapor from the mid stage generator is passed through a mid stage condenser 30 that is housed in the same shell 31 as the low stage generator 33. Solution from the mid-temperature heat exchanger 20 is circulated through the low temperature generator where it is placed in heat exchange relationship with the mid stage condenser tubes. Here again, the refrigerant in these condenser tubes is reduced to a liquid and the liquid is combined with refrigerant from the high stage condenser in liquid line 40 and the combined liquid condensate is delivered into the lower stage condenser 42.

Strong solution leaving the low temperature generator is passed through the low temperature heat exchanger 19 and the resulting strong solution is delivered to a spray header 43 mounted in the top section of the absorber. The combined liquid refrigerant is fed from the low temperature condenser 42 into a spray head 45 located in the top section of the system evaporator and used in the evaporator to provide cooling.

A domestic or other water heater or condenser generally referenced 50, is connected into the vapor line 51 that runs between the mid stage generator 25 and the mid stage condenser 30. Refrigerant vapor from the mid stage generator is placed in heat transfer relation with domestic or other water that is passed through the water heater/condenser vessel via lines 54 and 55. The refrigerant that is condensed in the vessel is returned to the mid stage generator via return line 58. A remotely regulated control valve 60 is placed in the return line, the purpose of which will be explained in greater detail below.

A pair of control valves 61 and 62 are also mounted in the weak solution supply line 63 and the strong solution line 64, respectively adjacent to the upper stage generator. The two valves can be remotely cycled to prevent circulation of solution through the high temperature generator when the machine is placed in a water heating mode. At this time, a three-way valve 67 in the liquid line 40 is also cycled to return liquid refrigerant from the high temperature condenser 27 back to the high stage generator via refrigerant return line 68. Accordingly, hot refrigerant vapor is now circulated from the high temperature upper stage generator through the upper stage condenser and returned to the upper stage generator.

Opening valve 60 now allows hot vapor from the mid stage generator to circulate through the domestic water heater 50 raising the temperature of the water to a desired level which is typically about 175° F.

A control valve 70 is also mounted in the condensate liquid line 71 leaving the mid stage condenser 30. A further control valve 72 is also mounted in the solution line 73 leaving the mid stage generator. The valves are cycled when the system is placed in a water heating mode to prevent loss of refrigerant and solution from the mid temperature generator and condenser.

As should now be evident, in the present system, energy from the high temperature generator can now be effectively used to heat domestic water to about a 175° F. level without the domestic hot water condenser having to meet the safety code requirement for high pressure vessels. Although the present invention has been described with specific reference to a three-stage absorption system, it should be evident that the invention can be utilized in all types of multi-stage machines without departing from the teachings of the invention. Similarly, the present invention can also be employed in high pressure multiple stage machines in which the solution moves through the various stages in a parallel flow or other multi-stage configurations rather than in the series flow configuration as herein described as an example.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of producing hot water in a multi-stage absorption system wherein an upper stage containing a generator that is connected to a condenser operates at above atmospheric pressure and a lower stage containing a generator that is connected to a condenser operates at or near atmospheric pressure, the method including the steps of:

placing the upper stage condenser in heat transfer relation with the lower stage generator wherein energy from the upper stage refrigerant vapor is used to vaporize refrigerant in said lower stage generator, terminating the flow of solution to and from the upper stage generator, preventing the loss of solution from the lower stage generator and the loss of condensate from the lower stage condenser, and recirculating condensate from the upper stage condenser back to the upper stage generator, and connecting a hot water condenser to said lower stage generator so that vapor from said lower stage generator is circulated through said hot water condenser to heat said water.

2. The method of claim 1 that further includes the steps of mounting a first control valve in a solution inlet line to the upper stage generator and a second control valve in a solution outlet line to said upper stage generator and cycling said valves to terminate the flow of solution through the upper stage generator.

3. The method of claim 2 that includes the further step of placing a third control valve in a solution return line of the lower stage generator and cycling said third valve to prevent loss of solution from said lower stage generator.

4. The method of claim 3 that includes the further step of placing a fourth control valve in a condensate outlet line of the lower stage condenser and cycling said fourth control valve to prevent loss of condensate from said lower stage condenser.

5. The method of claim 4 that includes the further step of mounting a three-way valve in a condensate outlet line of the upper stage condenser, connecting the three-way valve to the upper stages generator and cycling the three-way valve so that condensate from the upper stage condenser is recirculated through the upper stage generator.

6. The method of claim 5 that includes the further step of mounting a fifth control valve in a circulating line for passing refrigerant vapor from the lower stage generator through the hot water condenser and cycling the fifth valve to permit refrigerant vapor to pass through the hot water condenser.

7. The method of claim 6 that further includes the step of remotely cycling said valves to place the system in a water or fluid heating mode.

8. Apparatus for heating water in a multi-stage absorption refrigeration system having an upper stage containing a generator that is connected to a condenser that operates above atmospheric pressure and a lower stage containing a generator that is connected to a condenser that operates at or near atmospheric pressure, wherein the upper stage condenser is in heat transfer relation with the lower stage generator so that refrigerant vapor from the upper stage generator vaporizes refrigerant in said lower stage generator, said apparatus further including,

- a hot water condenser having means for selectively circulating refrigerant vapor formed in the lower stage generator in heat transfer relation with domestic water or to heat said water, and return the refrigerant to said lower stage generator,
- means for terminating the flow of solution passing into and out of said upper stage generator,
- means for preventing the loss of solution from the lower stage generator and the loss of condensate from the lower stage condenser, and
- means for recirculating condensate from the upper stage condenser back through the upper stage generator.

9. The apparatus of claim 8 that further includes a burner means for heating solution in said upper stage generator.

10. The apparatus of claim 8 wherein said means for recirculating condensate includes a three-way valve that is mounted in a condensate outlet line of the upper stage condenser and a condensate return line connected to said three-way valve for returning condensate from the upper stage condenser to the upper stage generator.

11. The apparatus of claim 10 wherein said means for terminating the flow of solution through said upper stage generator includes a first control valve mounted in a solution inlet line to the upper stage generator and a second control valve mounted in a solution outlet line from said upper stage generator.

12. The apparatus of claim 11 wherein the means for preventing loss of solution from the lower stage generator is a third control valve that is mounted in a solution return line from said lower stage generator.

13. The apparatus of claim 12 wherein the means for preventing loss of condensate form the lower stage condenser is a fourth control valve mounted in the condensate outlet line form the lower stage condenser.

14. The apparatus of claim 13 wherein said means for selectively recirculating vapor through said hot water condenser includes a recirculating line for passing refrigerant from the lower stage generator through said hot water condenser and a fifth control valve mounted in said recirculating line.

15. The apparatus of claim 14 wherein all valves are remotely controlled valves.

* * * * *